Feb. 5, 1924.
J. F. LAMB
FRICTION CLUTCH
Filed Oct. 20, 1920
1,482,402
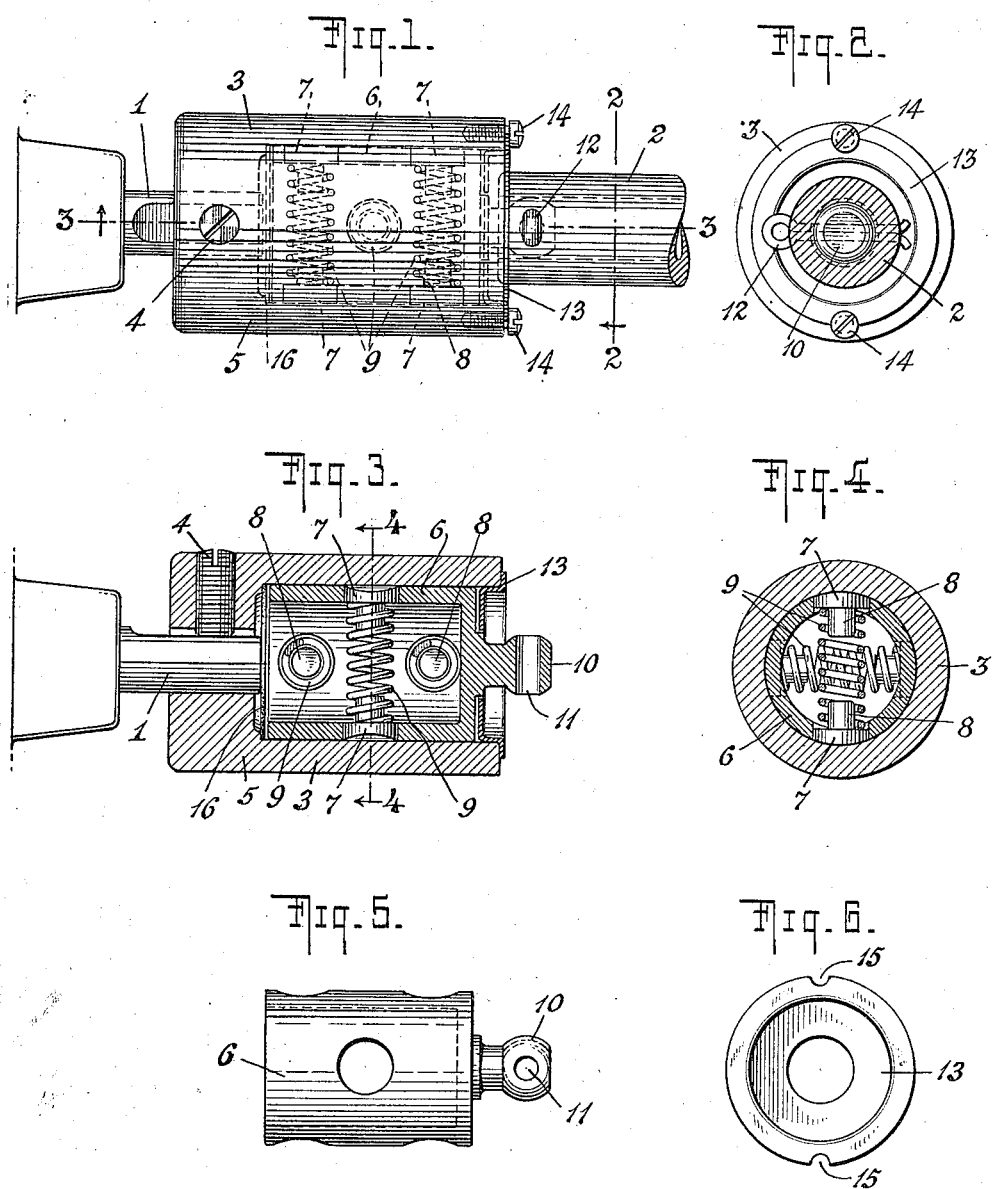
INVENTOR
*J. F. LAMB*
BY
ATTORNEYS Patented Feb. 5, 1924.

1,482,402

UNITED STATES PATENT OFFICE.

JOSEPH F. LAMB, OF NEW BRITAIN, CONNECTICUT, ASSIGNOR TO LANDERS, FRARY & CLARK, OF NEW BRITAIN, CONNECTICUT, A CORPORATION OF CONNECTICUT.

FRICTION CLUTCH.

Application filed October 20, 1920. Serial No. 418,239.

*To all whom it may concern:*

Be it known that I, JOSEPH F. LAMB, a citizen of the United States, residing at city of New Britain, county of Hartford, and State of Connecticut, have invented a certain new and useful Improvement in Friction Clutches, of which the following is a full, clear, and exact description.

My invention relates to improvements in friction clutches and has for its objects to provide a friction clutch in which the heat due to friction when the clutch is overloaded acts to reduce the clutch action; a clutch from which the oil is not liable to escape and in which the oil when the clutch is in operation is automatically thrown toward the friction surfaces, where its presence is desired; a clutch whose outer member is a container whose ends are sealed so as to form a practically closed chamber containing the oil; a friction clutch in which there is no axial thrust, and in which the radial thrusts are balanced; and further, a clutch which is light in weight and positive in action, and in which the parts are simple to manufacture and can be easily assembled.

The following is a description of an embodiment of my invention, reference being had to the accompanying drawing, in which, Fig. 1 is a side elevation of a clutch embodying my invention, the same being connected to driving and driven shafts;

Fig. 2 is an end view of the clutch, the driven shaft being shown in section on the line 2—2, Fig. 1;

Fig. 3 is a longitudinal section on the line 3—3, Fig. 1, the driven shaft being omitted;

Fig. 4 is a section on the line 4—4, Fig. 1;

Fig. 5 is a side elevation of the internal member; and,

Fig. 6 is a detail side elevation of the cap inclosing one end of the external cylinder.

Referring more particularly to the drawings, 1 is a driving shaft such as, for instance, the shaft of an electric motor and 2 is a driven shaft. 3 is the outer casing of the friction clutch proper, the same consisting of a casting having an internal bore and provided with a hole at one end of much smaller diameter than the internal bore for the reception of the shaft 1. 4 is a set-screw passing through the end 5 of the casing for securing the clutch to the end of the shaft 1. Within the bore of the casing 3 is a cylinder 6 having one or more diametrical bores in which are located friction blocks 7, whose outer surfaces conform to the curved inner surfaces of the bore in the casing 1. These blocks are provided with projections 8. Surrounding the projections 8 of each pair of plugs is a spring 9, which acts to force the blocks 7 of that pair outward into strong frictional engagement with the inner surface of the bore of the casing 3. The inner member 6 constitutes a carrier for the blocks 7 and is provided with an extension 10, provided with a perforation 11 through which is passed a cotter pin 12 securing the driven shaft 2 thereto. The open end of the bore in the casing 3 is closed by a cap 13, which makes a liquid tight fit with the mouth of the bore in the casing 3 and may be held in position by screws 14, the heads of which overlap the flange of the cap 13, the shanks being in the notches 15 thereof.

With the construction shown, the thrusts are all balanced and are radial, as distinguished from being axial. The bore of the casing 3 is supplied with oil or other lubricant, which, as the clutch revolves, is thrown by centrifugal force outward so as to be kept at the inner surface of the bore within the casing 3. In this way, when the clutch is in operation, oil is kept away from the opening through which the shaft 1 enters and from the opening in the cap 13, through which the projection 10 protrudes. When the device is at rest the oil settles in the bottom, but is not of sufficient quantity to reach these openings. If desired, a fiber plate 16 may be interposed between the end of the carrier member 6 and the opening through which the shaft 1 passes.

The inner member 6 may be and preferably is made hollow, as shown in Figs. 3 and 4. This reduces the weight of the device and causes less strain on the motor and also less strain if for any reason the shaft should be out of balance. It further provides a chamber in which lubricant within the clutch may settle when the motor is at rest. The blocks 7 are preferably made of phosphor bronze. The other parts may be made of steel. I preferably make the clutch with a plurality of pairs of blocks 7 with their corresponding springs 9, and for heavy work use three such pairs, as show in the drawing. The outer and the carrier members can be moved slightly longitudinally relating to one another without interfering with the action of the device.

In normal operation the carrier member rotates synchronously with the outer casing. If the driven shaft is blocked, however, the outer casing can revolve independently and the friction drag becomes less than the clutching effect present before the relative movement began. As the clutch continues to slip, this frictional drag becomes still less because the heating of the casing 3 when the clutch is overloaded causes it to expand radially so as to increase the diameter of its internal bore so as to reduce the pressure of the blocks 7 thereon.

As will be evident to those skilled in the art, my inventions permits of various modifications without departing from the spirit thereof or the scope of the appended claims.

What I claim is:

1. The combination of an outer member having a cylindrical bore, a carrier member rotatable therein, said carrier member having a transverse opening extending therethrough, friction blocks in the ends of said opening, and a single compression spring between said blocks acting on both of them to force them outward into engagement with the inner surface of said bore, the outer and carrier members being adapted to be secured to the shaft ends, said carrier member having a bore extending axially from its inner end forming a chamber connected with said transverse openings and across which said spring extends.

2. The combination of an outer member having a cylindrical bore, a carrier member rotatable therein, said carrier member having a transverse opening extending therethrough, friction blocks in the ends of said opening, and a compression spring between said blocks acting to force them outward into engagement with the inner surface of said bore, the outer and carrier members being adapted to be secured to the shaft ends, said carrier member having a second transverse opening extending therethrough, additional friction blocks in the ends of said opening, and a spring between said additional blocks, said first and second mentioned transverse openings having their axes out of alinement.

3. In a clutch the combination of two oppositely opening cup-shaped members relatively movable and arranged one within the other with their axes in alinement and their closed portions at opposite ends so as to form a lubricating chamber in communication with the outer peripheral suface of said inner member, means for connecting separate shafts to the two closed portions, respectively, and friction members carried by the inner member and engaging the inner suface of the outer member.

4. In a clutch the combination of two oppositely opening cup-shaped members arranged one within the other with their axes in alinement their closed portions at opposite ends so as to form between them a lubricating containing chamber, means for connecting separate shafts to the two closed portions, respectively, friction members carried by the inner member and engaging the inner surface of the outer member, and annular means carried by the outer member and making a liquid tight joint with the periphery of its open end so as to prevent lubricant in said inner cup-shaped member escaping through said outer member.

5. A driving shaft and a driven shaft in axial alinement, in combination with relatively rotatable clutch members arranged axially one within the other and connected with the ends of the shafts, respectively, the inner clutch member having its inner end hollowed out axially to provide a chamber for the reception of lubricant and having one end in communication with the inner peripheral surface of the outer clutch member and having its peripheral wall provided with an aperture, and a spring pressed friction block mounted to slide in said aperture and engaging the inner peripheral surface of the outer clutch member.

6. A clutch having in combination a driving member and a driven member arranged one within the other and relatively rotatable about the same axis, the inner member having its inner end hollowed out axially to form a lubricant containing chamber, a pair of diametrically opposed friction blocks for engagement with the inner surface of the outer member and mounted to slide in apertures in the peripheral wall of said lubricant containing chamber and diametrically arranged with reference to the axis of said chamber, a second pair of friction blocks for engagement with the inner surface of said outer member and sliding in apertures in a peripheral wall of said lubricant containing chamber, said two pairs of lubricating blocks being arranged in different planes transverse to the axis of said chamber, and springs suitably arranged to press said friction blocks against the inner surface of said outer member.

JOSEPH F. LAMB.